United States Patent
Siemens et al.

(10) Patent No.: US 6,345,671 B1
(45) Date of Patent: Feb. 12, 2002

(54) FLEXIBLE GROUND-DRIVEN RESIDUE MANAGEMENT WHEEL

(75) Inventors: Mark C. Siemens; Robert F. Correa; Dale E. Wilkins, all of Pendleton, OR (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 09/594,659

(22) Filed: Jun. 15, 2000

(51) Int. Cl.[7] .............................................. A01B 21/04
(52) U.S. Cl. ...................................... 172/556; 111/139
(58) Field of Search ............................ 111/52, 139, 62, 111/73, 80, 85–88, 121, 164, 191, 200; 172/198, 199, 155, 177, 556, 520, 540, 545, 548, 574

(56) References Cited

U.S. PATENT DOCUMENTS

| | | |
|---|---|---|
| 4,785,890 A | 11/1988 | Martin |
| 5,050,372 A | 9/1991 | Heiskell |
| 5,076,180 A | 12/1991 | Schneider |
| 5,279,236 A | 1/1994 | Traux |
| 5,341,754 A | 8/1994 | Winterton |
| 5,349,911 A | 9/1994 | Holst et al. |
| 5,394,946 A | 3/1995 | Clifton et al. |
| 5,461,995 A | 10/1995 | Winterton |
| 5,477,792 A | 12/1995 | Bassett et al. |
| 5,588,382 A | 12/1996 | Embree et al. |
| 5,653,292 A | 8/1997 | Ptacek et al. |
| 5,657,707 A | 8/1997 | Dresher et al. |
| 5,704,430 A | 1/1998 | Smith et al. |
| 5,878,678 A | 3/1999 | Stephens et al. |
| 5,896,932 A * | 4/1999 | Bruns et al. ................. 172/556 |
| 5,957,217 A | 9/1999 | Gunnink |
| 6,067,918 A * | 5/2000 | Kirby ........................ 111/121 |

OTHER PUBLICATIONS

"Terminology for Soil–Engaging Components for Conversation–Tillage Planters, Drills and Seeders," *ASAE Standard*: *ASAE S477*: 272–277 (1989).
Yetter Defining Solutions pp. 1–23 (1998).

* cited by examiner

*Primary Examiner*—Robert E. Pezzuto
(74) *Attorney, Agent, or Firm*—Thanda Wai; Margaret A. Connor; M. Howard Silverstein

(57) ABSTRACT

The present invention is directed to a ground-driven residue management wheel attachment for seeding equipment comprising of a fingered wheel, inner ring, and spring-loaded arm. The fingered wheel and inner ring pin crop residue to the ground surface and prevent residue from lodging on the farrow-opening device of the seeding unit. The fingered wheel and inner ring also act as a shield and prevent soil disturbed by the furrow-opening device from being thrown out of the seed furrow. The adjustable spring-loaded arm is able to pivot about the vertical and horizontal axes and provides downpressure to keep the fingered wheel in contact with the ground surface.

14 Claims, 5 Drawing Sheets

FLEXIBLE GROUND-DRIVEN RESIDUE MANAGEMENT WHEEL

BACKGROUND OF THE INVENTION

1. Field of the Invention

The present invention is directed to the field of conservation tillage, and more particularly, minimum- or no-till agriculture. The invention is drawn to a low disturbance attachment for agricultural seeding equipment to prevent or substantially reduce seeding equipment plugging in heavy crop residue conditions.

2. Description of Related Art

The benefits of conservation tillage, whether it be reduced tillage, minimum tillage, or no-till, have been well documented for most agricultural regions of the United States and for the world. These benefits include, but are not limited to, maintaining or increasing soil organic matter, increasing water infiltration rates, reducing wind and water erosion, reducing runoff, decreasing energy and power requirements, and limiting the number of farm operations required to raise a crop. Despite these advantages, the percentage of no-till farmland in the United States is only about 15%. The limited adoption of this practice is due not only to economic and agronomic concerns, but also to the lack of trouble-free, reliable seeding equipment for planting into heavy residue. Commercial shank- and disc-type no-till drills were developed primarily for low crop residue conditions for crops planted in wide rows. In heavy crop residue or when row spacing is narrow, shank-type drills are prone to plugging, causing operator frustration and reducing field capacity. They also tend to cause large piles of residue to form which cover the crop row and choke out young seedlings. Another problem with shank-type drills is that the furrow-opening shank disturbs the soil with sufficient force such that the uncontrolled soil is thrown out of the seed furrow and occasionally onto the adjacent seed row. This problem adversely affects seeding depth and seedling emergence. Disc-type drills are prone to hair-pinning straw into the seed furrow, rather than placing seed into moist soil with good seed to soil contact.

A trouble-free planting system that will reliably seed into heavy crop residue does not exist in the marketplace today. Attachments, such as specially shaped shank shrouds, are available; however, they are not particularly effective. Pairs of spiked wheels operating in front of the furrow-opening device are conceptually similar to the present invention; however, these row cleaners move the crop residue away from the furrow-opening device, rather than simply holding it in place. Row cleaners work well for wide-row, low-residue crops; however, for narrow-row heavy residue crops such as wheat, the residue is moved from one row to an adjacent row, the action causing problems with clogging and seedling emergence. These row cleaners also tend to disturb the soil surface. This disturbance decreases soil aggregate size and makes the soil surface more vulnerable to erosion.

U.S. Pat. No. 4,785,890 discloses a row cleaning apparatus comprising a pair of pointedly toothed wheels to selectively clean away mulch from conservation tilled fields without cultivation of the soil. U.S. Pat. No. 5,461,995 discloses an apparatus having a spring mechanism that may be adjusted as necessary to change the downward or upward force exerted on the implement. U.S. Pat. No. 5,279,236 teaches a seed drill equipped with an array of forwardly located trash disks in order to clear trash in the immediate vicinity ahead of each double disk furrow-opening assembly. U.S. Pat. No. 5,349,911 discloses a clearing wheel having peripheral teeth for clearing mulch and a means for attaching the clearing assembly. Each of the cited patents addresses the problems of clearing and planting using minimum- or no-till methods. The cited patents do not teach an apparatus that can plant through light and heavy residue using minimum- or no-till methods.

SUMMARY OF THE INVENTION

We have now discovered a flexible ground-driven residue management attachment to be used in conjunction with any seeding unit for conservation tillage planting. The attachment comprises a flexible-fingered wheel that is positioned adjacent to the furrow opener of the seeding unit and is designed to pin the crop residue to the ground as the furrow opener drills the row. The fingered wheel operates in tandem with a resilient ring (tire) that rotates together with the wheel and acts as a spacer and helps to position the flexible fingered wheel such that the fingers are engaged in firm, undisturbed soil. The attachment is designed to swing free of accumulated residue, rocks or other obstacles encountered by the wheel.

The general aim of the present invention is to provide a low disturbance attachment for agricultural seeding equipment for use in minimum- or no-till agricultural applications.

An object of the invention is to prevent or substantially reduce seeding equipment plugging in heavy crop residue conditions.

Another object of the invention is to provide an attachment that allows the seeding equipment to be used for crops, such as wheat, that are grown in narrow-spaced rows.

A further object of the invention is to provide an attachment that helps to reduce the number and size of piles which form behind the seeding device and controls the soil so that it stays within the seed row.

Still another object of the invention is to provide a flexible fingered wheel that holds down residue as the seeder advances, in place of the prior art equipment, which move residue to the sides of the rows during planting.

An advantage of the residue management wheel of the invention is that it can be used with high efficacy in either low or high residue field conditions.

Another advantage of the residue management wheel of the present invention is that it may be used with any furrow-opening device.

An additional advantage of the residue management wheel of the present invention is that it works reliably in uneven terrain, such as large clods of dirt, rocks, or piles of residue.

DETAILED DESCRIPTION OF THE INVENTION

General Definitions

Figure 1:
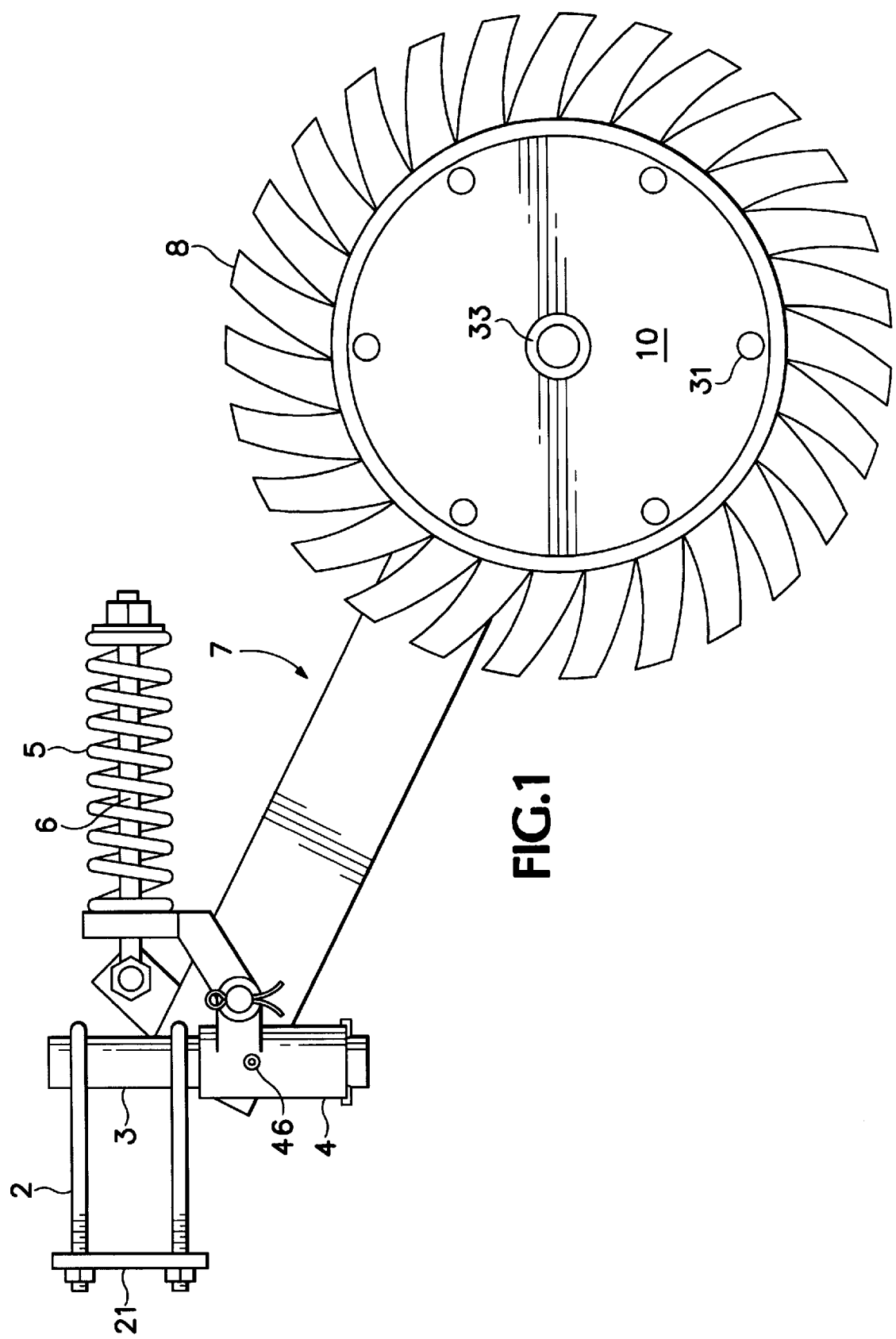
FIG. 1 is a front side view of the residue management wheel assembly and spring-loaded arm assembly.

Terminology referring to agricultural seeding equipment components is defined here according to ASAE Standard S477 (*ASAE Standards*, 46nd Ed. 1999. S477. Terminology for Soil-Engaging Components for Conservation-Tillage Planters, Drills and Seeders. St. Joseph, Mich.: ASAE). This reference is hereby incorporated by reference.

The amount of residue generated after harvest is dependent upon the crop that is grown, the spacing used for that crop, the type of soil, weather, and other environmental conditions.

Heavy residue is defined here as greater than 6,000 pounds of residue per acre.

Light residue is defined here as less than 4,500 pounds of residue per acre.

The term furrow opener includes but is not limited to: double-disc opener (with or without shoe), staggered double-disc opener (with or without shoe), runner opener, stub-runner opener, hoe opener, single-disc opener, coulter opener, chisel opener, wide-sweep opener, triple-disc opener, and powered blade or coulter opener (see pages 274–275, section 4.4, of ASAE Standard S477, cited above). For the purposes of illustration only, a shank-type furrow opener is used in the example shown in FIG. 5 and described below. It is to be understood that any furrow opener may be used with the residue management wheel of the present invention.

The term "walk" is defined here as the action of the flexible fingered wheel on residue as the flexible fingered wheel moves over undisturbed ground. The flexible fingered wheel moves over undisturbed residue by pressing residue to the ground, and not by moving the residue to the sides, and disturbs the ground minimally.

The present invention is an apparatus for use with a minimum- or no-till seeding unit having an elongated and laterally extending toolbar by which the seeding unit 52 is pulled forward, the seeding unit 52 having a means for opening a furrow in minimally tilled or untilled soil. The apparatus comprises a ground-driven, rotatably mounted flexible fingered wheel 8 biased against the ground, a rotatably mounted inner ring 9, a rotatably mounted circular plate 27 that covers the inner ring 9, and an adjustable pretensioned spring-loaded arm assembly 7, whereby the entire unit is attached to a toolbar 1 by a clamping device.

The principal component of the present invention comprises a ground-driven flexible fingered wheel 8. The fingered wheel 8 of the invention is made from any flexible and yet durable material that has material properties similar to that of 40 to 100 durometer rubber, more preferably 50–80 durometer rubber, and, even more preferably, 60–70 durometer rubber. An even more preferred embodiment of the invention is a rubber-fingered wheel made from 60 durometer rubber. The most preferred embodiment is a 60 durometer, neoprene rubber-fingered wheel. Neoprene rubber is made from 2-chloro-1,3-butadiene and is generically referred to as chloroprene rubber. The term "flexible" or "bendable" is used here to mean capable of bending repeatedly. The fingered wheel 8 of the present invention may also be described as "resilient", which means capable of withstanding shock without permanent deformation. In addition, the fingered wheel 8 of the present invention may also be described as "deformable", which means capable of a change of shape through stress. The flexible fingered wheel 8 has at least 3 fingers. The flexible fingered wheel 8 is positioned adjacent to the furrow opener 11 and at a lateral distance therefrom such that the fingered wheel 8 contacts soil not disturbed by the furrow opener 11. The flexible fingered wheel 8 has fingers that conform to the shape of the ground surface and are stiff enough that crop residue is adequately pinned between the fingered wheel 8 and the soil surface. The fingered wheel 8 pins crop residue to the soil surface on one side of the furrow along the planting line, preventing the crop residue from lodging on the furrow opener. The diameter and finger length of the rotatably mounted fingered wheel 8 are chosen such that the fingered wheel 8 causes the residue along the axis of direction of travel to be pinned between the fingered wheel 8 and the ground surface.

Figure 5:
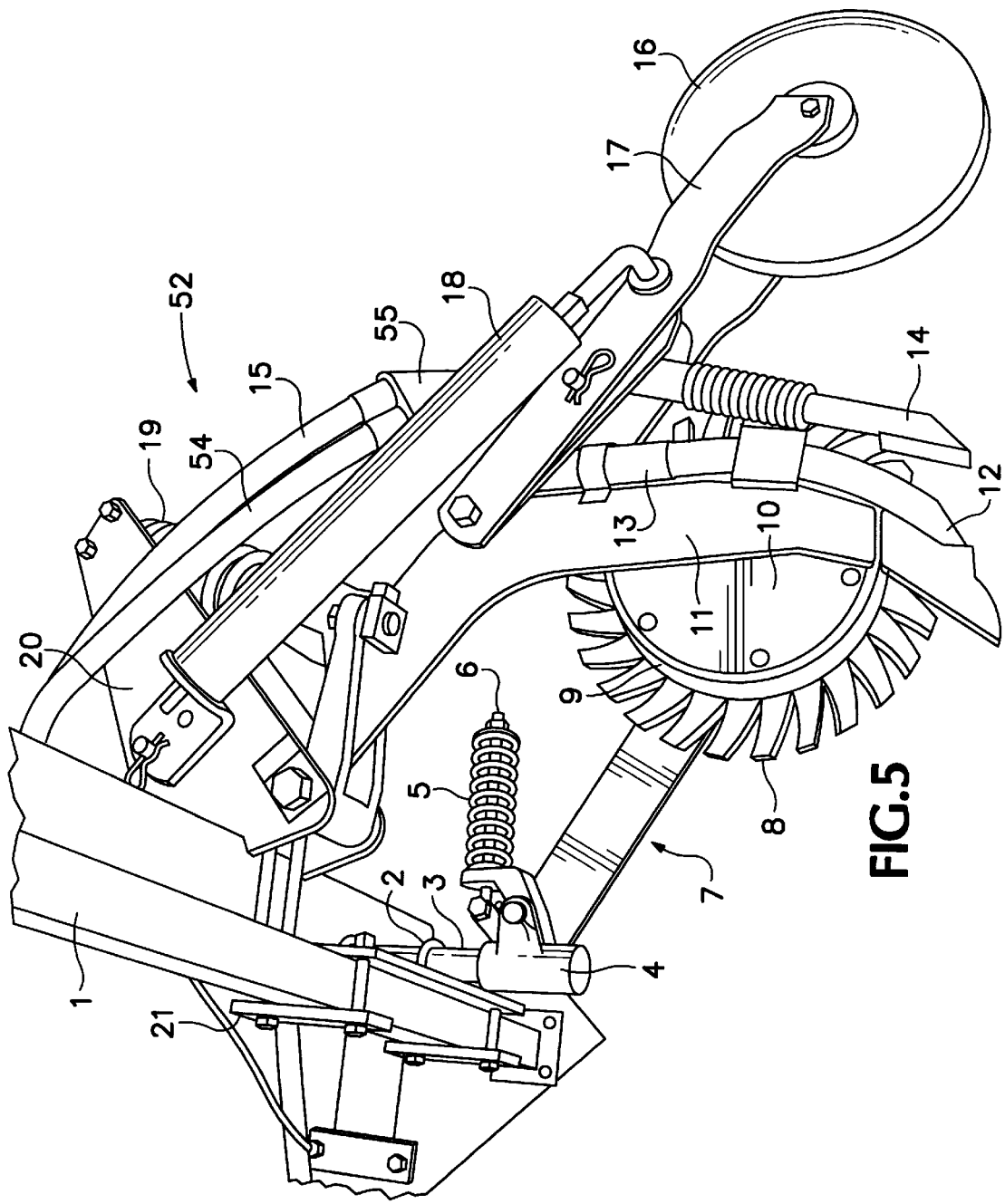
FIG. 5 is a perspective view of an exemplary planting unit with the residue management wheel attachment in accordance with the present invention.

A rotatably mounted flexible inner ring 9 is attached to the fingered wheel 8 and is positioned between the fingered wheel 8 and the furrow-opener 11. The inner ring 9 of the invention is made from any flexible and yet durable material that has material properties similar to that of 40 to 100 durometer rubber, more preferably 50–80 durometer rubber, and, even more preferably, 60–70 durometer rubber. An even more preferred embodiment of the invention is an inner ring 9 made from 60 durometer rubber. The most preferred embodiment is a 60 durometer, neoprene inner ring 9. The flexible fingered wheel 8 and the inner ring 9 are not necessarily made of a material having the same stiffness or durometer, but are chosen depending on the field conditions and combination of equipment used. The inner ring 9 serves as a spacer between the flexible fingered ring 8 and the furrow opener 11, such that the fingers are engaged in firm, undisturbed soil. The inner ring 9 also helps to hold down and walk through crop residue to prevent the residue from building up on the furrow opener or opener shank 11, as shown in FIG. 5. The thickness of the inner ring 9 is chosen such that the fingered wheel 8 is as close to the furrow-opening device 11 as possible and still makes ground contact with undisturbed soil. The inner ring 9 is positioned at an adjustable distance from the furrow opener 11 such that the fingered wheel 8 is as close to the furrow-opening device 11 as possible and still makes ground contact with undisturbed soil. The size of the rotatably mounted inner ring 9 in relation to the fingered wheel 8 is chosen such that a portion of the outer edge of the inner ring 9 engages the ground surface. The inner ring 9 engages the disturbed soil surface and crop residue, limiting the amount of disturbed soil forced out of the seed row. A circular plate 27 is rotatably mounted onto mounting ring 28, which covers the opening of ring 28 and protects inner ring 9 on the surface closest to the furrow opener 11 and further prevents disturbed soil from being forced out of the seed row.

The present invention also features a spring-loaded arm assembly 7 with adjustable pretension to apply downpressure to the fingered wheel 8 to keep it engaged with the ground. The rotatably mounted flexible fingered wheel 8 and rotatably mounted flexible inner ring 9 are mounted onto the adjustable pretensioned spring-loaded arm assembly 7, which pivots about a substantially vertical and substantially horizontal axis. This pivot allows the fingered wheel 8 and inner ring 9 to walk over obstacles more easily and to apply additional downpressure and thus increase traction when climbing over obstacles. The amount of spring pretension is sufficient for the rotatably mounted flexible fingered wheel 8 to pin crop residue between the fingers of the fingered wheel 8 and the ground surface and still allows the fingered wheel 8 to be able to easily walk over obstacles, such as large clods of dirt or piles of residue. The ability of the spring-loaded arm assembly 7 to pivot, in combination with the flexibility of the fingers of the fingered wheel 8, allows the present invention to be used in rocky soil with little or no damage to the fingered wheel or inner wheel.

The apparatus is attached to a toolbar 1 by a clamping device, which allows the vertical and/or horizontal position of the flexible fingered wheel 8 to be adjusted relative to the furrow opener 11. The attachment is clamped onto the seeding unit's toolbar 1 via u-bolts, hex bolts, and associated plates. The apparatus of the present invention may be used in any combination with any furrow-opening device, seeding tube, fertilizer tube, closing wheel, coulter blade, or other seeding or harvesting equipment.

Operation of the Invention

As the shank 11 of the moving seeding unit 52 enters the soil, the fingered wheel 8 engages the soil surface and individual fingers compress towards the inner axis and conform to the shape of the soil surface. The fingered wheel 8, in contact with the ground surface, is forced to rotate about a common, mostly horizontal shaft attached to the spring-loaded arm assembly 7. A length of residue, longer than the width of the shank 11 at the soil surface, is pinned between the soil surface and the fingered wheel 8. The inner ring 9 and hub assembly 10 are connected to the fingered wheel 8, and thus are also forced to rotate about the common, mostly horizontal shaft. As the fingered wheel 8 and inner ring 9 rotate, the residue pinned to ground by the fingered wheel 8 and inner ring 9, is forced around the furrow-opening shank 11. Additionally, the inner ring 9 acts as a spacer for laterally displacing the fingered wheel 8 from the shank 11 at a distance sufficient for the fingers to contact firm soil that is not disturbed by shank 11, thereby helping to prevent crop residue from lodging on the furrow-opening shank 11. By virtue of their forward orientation, the fingers of the fingered wheel 8 flings the residue towards the rear of the seeding unit 52, as they rotate out of contact with the soil surface. It was observed that the flexibility of the fingers on the fingered wheel 8 provide for a much larger contact area with the ground surface and better holding capacity than a stiffer non-flexible fingered wheel or a non-fingered wheel. Optimal flexibility of the fingered wheel 8 is chosen such that little or no soil disturbance is caused by the fingered wheel 8. The spring-loaded arm assembly 7, to which the fingered wheel 8, inner ring 9, and hub assembly 10 are attached, is also able to pivot about a mostly vertical shaft 3 and thus provides downpressure to keep the fingered wheel 8 in contact with the ground surface. Thus, when clumps of crop residue or clods of soil build up between the inner ring 9 and the furrow opener 11, the spring-loaded arm assembly 7 is able to pivot about the mostly vertical shaft 3, away from the furrow opener 11, and allows the residue and soil to dislodge. After swinging out, the flexible fingered wheel 8 and inner ring 9 will naturally track back into its operating position, close to the furrow opener 11. Although the spring-loaded arm assembly 7 is able to pivot freely, there is a mechanical stop shown here as comprising of pin 60 (FIG. 4) and slot 59 in hinge casting 4 that limits the spring-loaded arm assembly 7 from swinging more than 35 degrees away from the furrow opener 11. This mechanical stop prevents the spring-loaded arm assembly 7 from swinging uncontrollably when the furrow opener 11 is out of the ground and keeps the spring-loaded arm assembly 7 and fingered wheel 8 generally aligned with the direction of travel. Since the fingered wheel 8 can be positioned such that a line connecting the center of the mostly vertical shaft 3 about which the spring-loaded arm assembly 7 pivots in the mostly horizontal plane and the position where the fingered wheel 8 nominally contacts the ground surface is nearly parallel to the direction of travel of the seeding unit 52, the frictional forces exerted by the ground on the fingered wheel 8 serve to keep the fingered wheel 8 oriented in this position. Thus, if the fingered wheel 8 is forced away from the furrow opener 11 by crop residue or soil clods, the material subsequently becomes dislodged and passes by the furrow opener 11. Frictional forces on the fingered wheel 8 will naturally push the fingered wheel 8 back into its operating position, which is close to the furrow opener 11.

Detailed Description of the Figures

Figure 2:
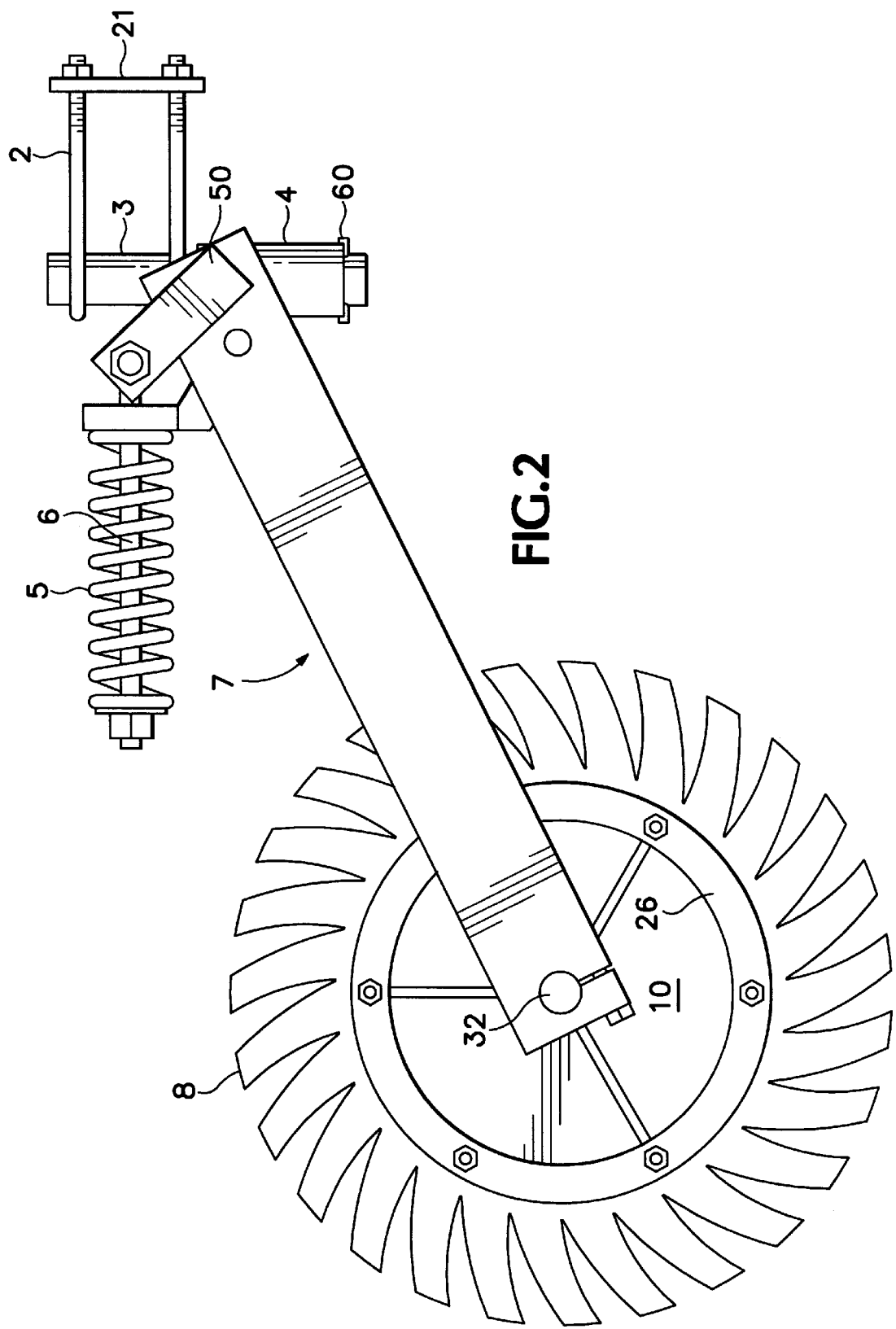
FIG. 2 is a rear side view of the residue management wheel assembly and spring-loaded arm assembly.
Figure 3:
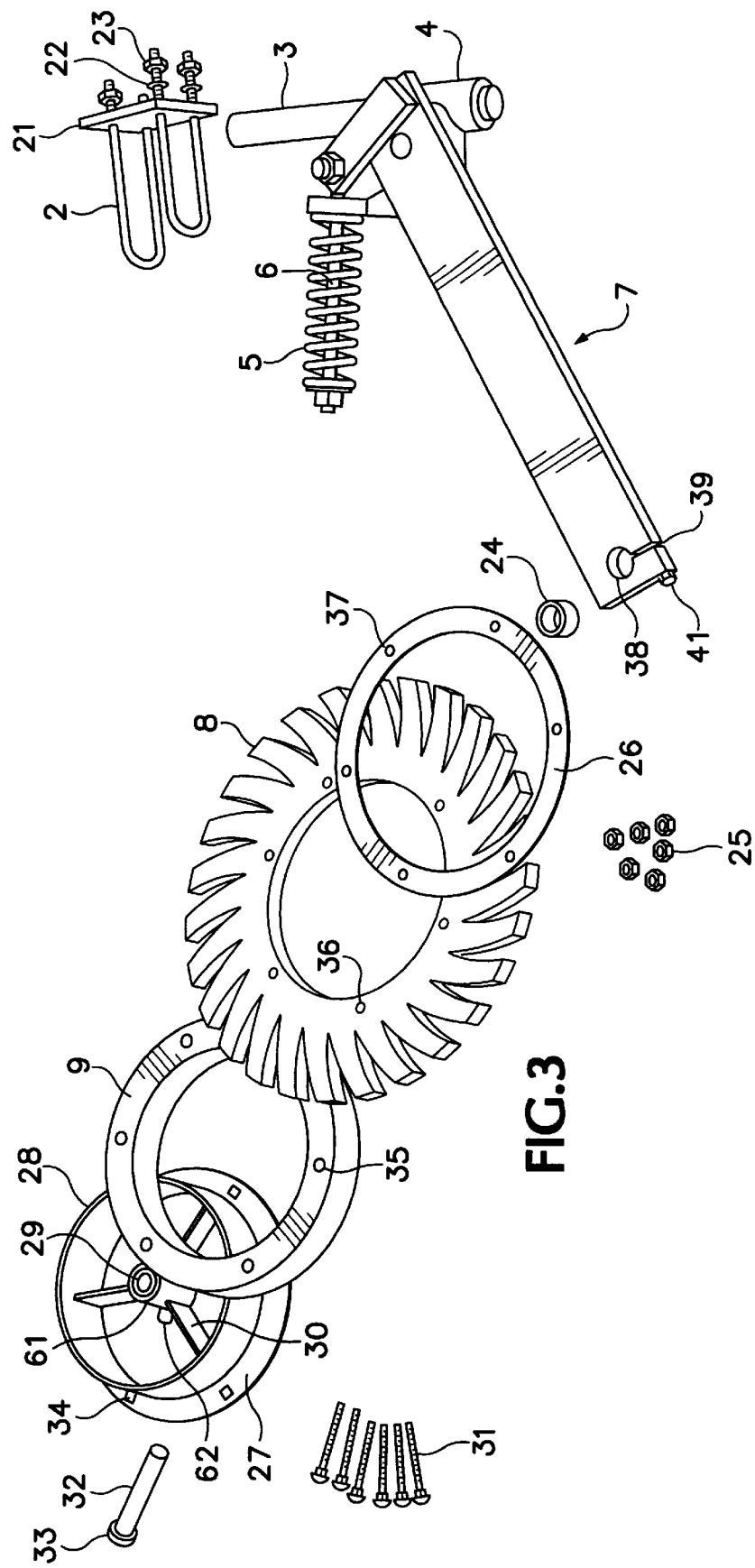
FIG. 3 is an exploded perspective view of the residue management wheel assembly and spring-loaded arm assembly.

FIGS. 1, 2, and 3 show components of the present invention. The figures describe the details of how the flexible fingered wheel 8, inner ring 9, circular backing plate 27, spring-loaded arm assembly 7, and hub assembly 10 are assembled. Common axle 32 connects to the spring-loaded arm assembly 7 at hole 38. The axle 32 having axle cap 33 is held in place by decreasing the effective circumference of hole 38 by tightening bolt 41 which closes slot 39 and compresses lock washer 40. Axle 32 acts as the bearing surface for the hub assembly 10, which is comprised of a circular backing plate 27 having square holes 34, mounting ring 28, gussets 30, cylindrical tube 61 with grease fitting 62, and bushing 29. These components are assembled in a standard fashion with the cylindrical tube 61 welded onto the center of circular plate 27 and gussets 30 welded to support said cylindrical tube 61. Bushing 29 is housed in cylindrical tube 61. The mounting ring 28 is also welded in the center of circular plate 27 and is wide enough to provide support for inner ring 9 and fingered wheel 8. Inner ring 9 having holes 35 and fingered wheel 8 having holes 36 are held to the backing plate 21 by carriage bolts 31, which are attached to a retaining ring 26 having holes 37. A spacer ring 24 is sized such that a line connecting the horizontal center of fingers on the fingered wheel 8 and the center of mostly vertical shaft 3 is perpendicular to the longitudinal axis of axle 32. The residue management wheel of the present invention is attached to the seeding unit 52 by securing vertical shaft 3 to seeding unit toolbar 1 using backing plate 21 and u-bolts 2. The nuts of u-bolts 2 are tightened against backing plate 21 to provide the clamping force. Therefore, the vertical and horizontal positions of the fingered wheel 8, relative to shank 11, are easily adjusted.

Figure 4:
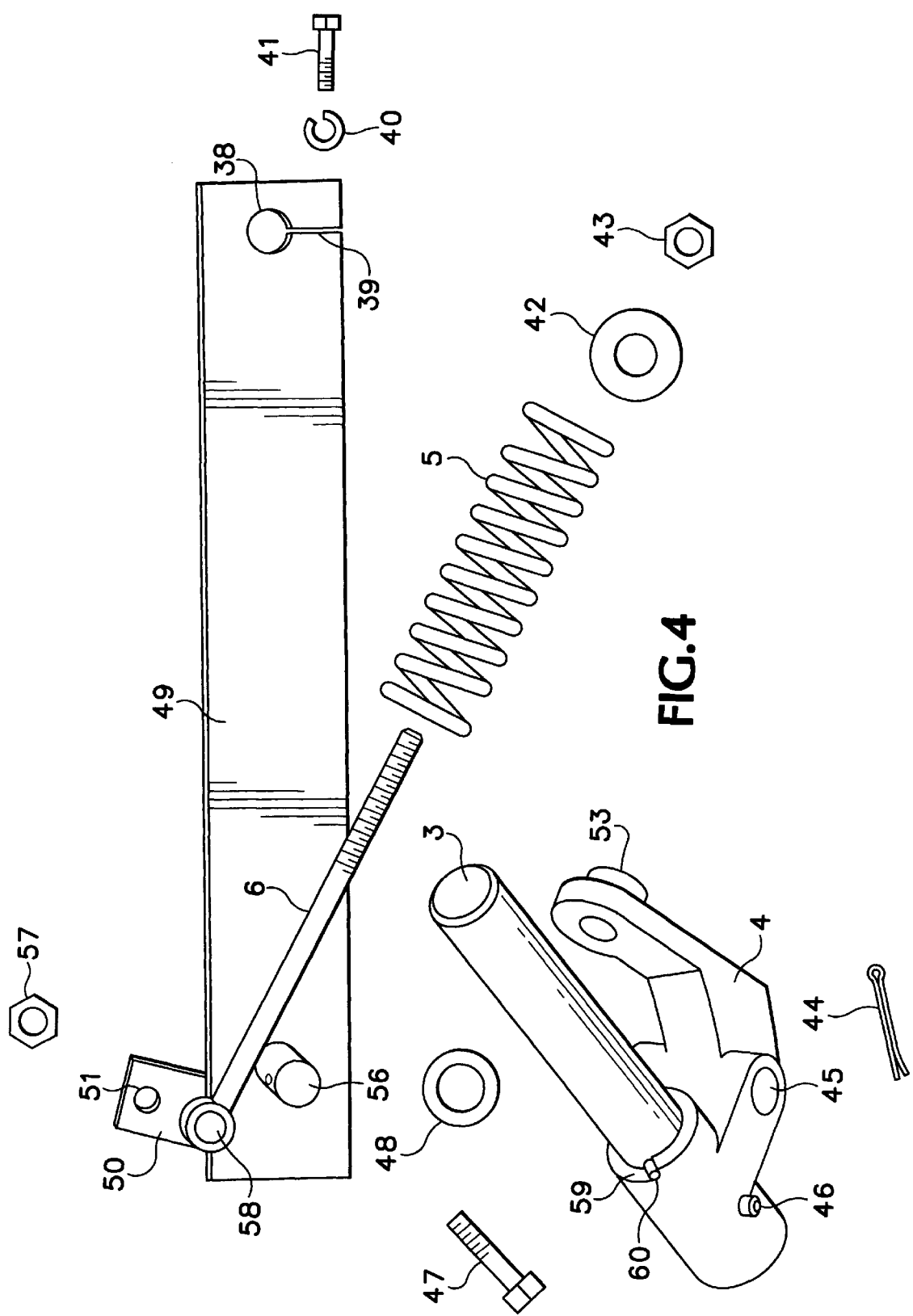
FIG. 4 is a an exploded view of the spring-loaded arm assembly.

FIG. 4 shows the components of the spring-loaded arm assembly 7 and describes the structure in detail. A hinge casting 4 provides both mostly horizontal (shaft 56) and mostly vertical (vertical shaft 3) bearing surfaces. A grease fitting 46 allows the bearing surfaces of the hinge casting 4 to be lubricated. The push rod 6 is attached to plate 50 via a bolt 47, which connects through holes 58 and 51, and is secured with nut 57. Push rod 6 also threads hinge casting 4, hole 53, spring 5, and washer 42, all of which are secured with nut 43. Since hinge casting 4 provides a circular thru hole 53 through which push rod 6 can freely move, spring 5 can be compressed between hinge casting 4 and washer 42 by tightening nut 43 onto push rod 6. Thus, when flat plate arm 49 pivots with respect to the hinge casting 4, spring 5 compresses. The relative movement of arm 49, with respect to casting 4, provides downpressure to keep fingered wheel 8 in contact with the ground surface and keeps the residue pinched between the fingered wheel 8 and the soil surface. The amount of downpressure required for the fingered wheel 8 to hold the residue pinched in place and still be able to easily walk over obstacles, such as large clods of dirt, rocks or piles of residue, depends on soil type, type and condition of residue, and roughness of the soil surface. Thus, the present invention provides for adjustable amounts of downpressure supplied to fingered wheel 8 by tightening and loosening nut 43 against push rod 6.

FIG. 5 shows the apparatus of the present invention attached to an exemplary agricultural seeding unit 52, less the seed metering system. In practice, it is common that several seeding units 52 are attached to a common seeding unit toolbar 1, via a toolbar attachment assembly 20, and pulled by a power unit. As the unit 52 is pulled forward, a spring-loaded (19) furrow-opening shank 11 penetrates the soil and opens a furrow. A seed delivery tube 14, attached to a spring-loaded arm assembly 7 follows the shank 11 for the purpose of placing seed in the ground. A packer wheel 16 attached to arm 17 closes the open furrow, packs loose soil over the seed and provides seeding depth control. Packer wheel 16 downpressure is provided by spring-loaded arm assembly 18. Seed and primary fertilizer are metered and delivered to the individual seeding unit 52 via the flexible seed tube 54 and the primary fertilizer flex tube 13, respectively. Starter fertilizer, beneficial for certain crops, is metered and delivered via the starter fertilizer delivery flex tube 15. When starter fertilizer is applied with the seed, it is mixed with the seed in the conical two to one connector 55, and is then delivered with the seed into the ground via the seed tube 14. Primary fertilizer is placed below and to the side of the seed by the fertilizer tube 12, which is attached to the furrow-opening shank 11. Other variations of seeding units contain functionally similar main components including a seed hopper, a furrow-opening device 11, a means of delivering the seed from a hopper to the soil, a means of controlling seeding depth, and a furrow-closing device. The particular unit shown here is for illustration purposes and should not be considered limiting.

The seeding unit 52, illustrated in FIG. 5, is representative of a seeding unit manufactured by Conserva-Pak™ Seeding Systems of Indian Head, Saskatchewan, Canada. The ground-driven residue management wheel assemblies of FIGS. 1, 2,3,4 and 5 can be used equally effectively with other types of seed drills and as an add-on attachment to shank-type and disk-type seed drills, row planters, etc. made by other manufacturers. Thus, it is to be understood that while certain forms of the present invention have been illustrated and described herein, it is not to be limited to the specific forms or arrangement of parts described and shown.

EXAMPLES

The present invention was evaluated in the fall season and the following spring at various locations in Northeastern Oregon. Test site locations varied significantly in the amount and condition of crop residue. A variety of different crops were planted (Table 1).

TABLE 1

Site description and seedling stand count results of flexible ground-driven residue management wheel evaluation study.

| Crop | Location | Combine Type | Residue Management | Residue lb/ac | Stubble Height in. | Residue Management Wheel | Stand Count plants/ft$^2$ | Percent Increase | Significance * |
|---|---|---|---|---|---|---|---|---|---|
| Fall Canola | Pendleton, OR | Stripper | Flail | 4500 | <2 | No | 9.6 | | |
| Fall Canola | Pendleton, OR | Stripper | Flail | 4500 | <2 | Yes | 14.5 | 52.7 | P=0.0001 |
| Fall Canola | Pendleton, OR | Stripper | Standing | 4500 | 19.0 | No | 11.3 | | |
| Fall Canola | Pendleton, OR | Stripper | Standing | 4500 | 19.0 | Yes | 16.2 | 43.7 | P=0.0001 |
| Spring Barley | Moro, OR | Cylinder | Chaff Spreader | 3229 | 11.4 | No | 12.6 | | |
| Spring Barley | Moro, OR | Cylinder | Chaff Spreader | 3229 | 11.4 | Yes | 15.7 | 24.0 | P=0.0394 |
| Mustard | Helix, OR | Rotary | No Chaff Spreader | 1611 | 7.5 | No | 3.9 | | |
| Mustard | Helix, OR | Rotary | No Chaff Spreader | 1611 | 7.5 | Yes | 5.5 | 41.0 | P=0.0085 |
| Lupin | Adams, OR | Rotary | Chaff Spreader | 3909 | 8.3 | No | 3.8 | | |
| Lupin | Adams, OR | Rotary | Chaff Spreader | 3909 | 8.3 | Yes | 4.2 | 8.7 | P=0.0941 |
| Spring Wheat | Adams, OR | Stripper | Standing | 8758 | 24.3 | No | 12.6 | | |
| Spring Wheat | Adams, OR | Stripper | Standing | 8758 | 24.3 | Yes | 14.4 | 14.7 | P=0.0971 |
| Spring Wheat | Adams, OR | Cylinder | Straw Chopper Chaff Spreader | 8758 | 8.5 | No | 12.4 | | |
| Spring Wheat | Adams, OR | Cylinder | Straw Chopper Chaff Spreader | 8758 | 8.5 | Yes | 14.4 | 16.2 | P=0.0749 |
| Winter Wheat | Pendleton, OR | Cylinder | Flail | 5944 | <2 | No | 19.8 | | |
| Winter Wheat | Pendleton, OR | Cylinder | Flail | 5944 | <2 | Yes | 23.2 | 17.2 | P=0.0016 |
| Winter Wheat | Pendleton, OR | Cylinder | Rotary Mow | 5944 | <2 | No | 19.8 | | |
| Winter Wheat | Pendleton, OR | Cylinder | Rotary Mow | 5944 | <2 | Yes | 23.6 | 19.5 | P=0.0016 |

*P-value of the two way ANOVA F statistic.

Three different types of combines were used to harvest the plots prior to seeding, including a stripper combine, a rotary combine, and a cylinder-type combine. Some of the combines were equipped with chaff spreaders, some with chaff spreaders and straw choppers, and some with neither, as indicated in Table 1. Table 1 also shows that in some trials the residue was left standing, while in other trials the residue was either flailed or rotary mowed. Amounts of residue present at the time of seeding ranged from a-low of approximately 1600 lb/ac to a high of almost 9,000 lb/ac. All experimental plots were 6 feet wide, at least 40 feet long and laid out in a replicated block design with at least 4 replications in each experiment. All plots were seeded with a 12-shank, 12-foot wide hoe-type plot drill with 12-inch row spacing. Six of the 12 shanks on one side of the drill were equipped with the present invention, the remaining 6 shanks on the opposite side of the drill were not. To ensure that the seeding unit uniformly delivered seed to both sides of the drill, additional plots were seeded without the present invention attached.

After the seedlings had emerged and the date of the last killing frost had past, stand counts in each plot were taken using the following procedure. First, a random sampling location, at least 15 feet from either end of the plot, was selected for each replication. The number of plants within 1.64 feet of either side of the sampling location were then counted and recorded for the inner 4 rows of each 6 row plot. The outer two rows of each plot were not counted to avoid end effects. A two-way ANOVA was performed using SAS (Statistical analysis software produced by SAS Institute Inc., Cary, N.C.) v 6.12 to determine if there were statistically significant differences between the treatment means. The results presented in Table 1 show that, as compared to the standard drill, the present invention was found to increase seedling stand count of fall-seeded canola in flailed stubble by 52.7 percent, fall-seeded canola in standing stubble by 43.7 percent, spring barley by 24 percent, mustard by 41 percent, lupin by 8.7 percent, spring wheat in standing-stripper combine stubble by 14.7 percent, spring wheat in combine residue that had been chopped and spread by 16.2 percent, winter wheat in flailed stubble by 17.2 percent, and winter wheat in rotary mowed stubble by 19.5 percent. These differences were found to be statistically significant at the p-values indicated in Table 1. No statistically significant differences in stand counts were found between the left- and right-hand sides of the drill when the present invention was removed from the drill.

REFERENCES

*ASAE Standards*, 46nd Ed. 1999. S477. Terminology for Soil-Engaging Components for Conservation-Tillage Planters, Drills and Seeders. St. Joseph, Mich.: ASAE.

The reference cited above and throughout the specification are incorporated by reference in their entirety.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. An apparatus for use with a seeding unit having an elongated and laterally extending toolbar by which the seeding unit is pulled forward, the seeding unit having a furrow opener for use in minimally tilled or untilled soil, said apparatus comprising:

(a) a ground-driven, rotatably mounted flexible fingered wheel biased against the ground, wherein the flexible fingered wheel is positioned adjacent to the furrow opener and at a lateral distance therefrom, and wherein the fingered wheel contacts soil not disturbed by the furrow opener; and (b) a rotatably mounted flexible inner ring, wherein the flexible inner ring is attached to the fingered wheel and is positioned immediately adjacent to the furrow opener.

2. The apparatus of claim 1 further comprising a rotatably mounted circular plate, wherein the circular plate covers the inner ring on the surface closest to the furrow opener.

3. The apparatus of claim 1 further comprising an adjustable pretensioned spring-loaded arm assembly, wherein the spring-loaded arm assembly pivots about a substantially vertical and substantially horizontal axis, to which the rotatably mounted flexible fingered wheel and rotatably mounted flexible inner ring are attached.

4. The apparatus of claim 1 further comprising a clamping device, wherein the clamping device allows the vertical or horizontal position of the flexible fingered wheel to be adjusted relative to position of the furrow opener.

5. The apparatus of claim 1, wherein the flexible fingered wheel has fingers that conform to the shape of the ground surface and are stiff enough that crop residue is adequately pinned between the fingered wheel and the soil surface.

6. The apparatus of claim 1, wherein the flexible fingered wheel is made from a flexible and durable material having properties of 40 to 100 durometer rubber.

7. The apparatus of claim 6, wherein the flexible fingered wheel is made from a flexible and durable material having properties of 60 to 70 durometer rubber.

8. The apparatus of claim 1, wherein the flexible fingered wheel is made from neoprene.

9. The apparatus of claim 8, wherein the flexible fingered wheel is made from 60 to 70 durometer neoprene.

10. The apparatus of claim 1, wherein the inner ring is made from a flexible and durable material having properties of 40 to 100 durometer rubber.

11. The apparatus of claim 10, wherein the inner ring is made from a flexible and durable material having properties of 60 to 70 durometer rubber.

12. The apparatus of claim 1, wherein the inner ring is made from neoprene.

13. The apparatus of claim 12, wherein the inner ring is made from 60 to 70 durometer neoprene.

14. The apparatus of claim 1 further comprising a seeding tube, fertilizer tube, closing wheel, coulter blade, row cleaner, or combination thereof.

* * * * *